(12) United States Patent
Zhu et al.

(10) Patent No.: US 12,631,496 B1
(45) Date of Patent: May 19, 2026

(54) WIRELESS HIGH-TEMPERATURE PROBE WITH TIME-MULTIPLEXED NTC LEADS AND MANUFACTURING METHOD THEREOF

(71) Applicant: SHENZHEN KUKI ELECTRONIC CO., LTD., Shenzhen (CN)

(72) Inventors: Rongyuan Zhu, Shenzhen (CN); Guo Qu, Shenzhen (CN); Weihua Xiu, Shenzhen (CN)

(73) Assignee: SHENZHEN KUKI ELECTRONIC CO., LTD., Shenzhen (CN)

( * ) Notice: Subject to any disclaimer, the term of this patent is extended or adjusted under 35 U.S.C. 154(b) by 0 days.

(21) Appl. No.: 19/403,346

(22) Filed: Nov. 28, 2025

Related U.S. Application Data

(63) Continuation of application No. PCT/CN2025/127187, filed on Oct. 13, 2025.

(30) Foreign Application Priority Data

Aug. 4, 2025 (CN) .......................... 202511082228.4

(51) Int. Cl.
| | |
|---|---|
| *G01K 1/024* | (2021.01) |
| *G01K 1/06* | (2006.01) |
| *G01K 1/08* | (2021.01) |

(52) U.S. Cl.
CPC .............. *G01K 1/024* (2013.01); *G01K 1/08* (2013.01); *G01K 1/06* (2013.01)

(58) Field of Classification Search
CPC ............. G01K 1/024; G01K 1/08; G01K 1/06
See application file for complete search history.

(56) References Cited

U.S. PATENT DOCUMENTS

| | | |
|---|---|---|
| 12,196,619 B2 | 1/2025 | Newhouse et al. |
| 12,352,631 B2 * | 7/2025 | Nivala ................... G01K 1/024 |

* cited by examiner

*Primary Examiner* — John E Breene
*Assistant Examiner* — Janice M Soto
(74) *Attorney, Agent, or Firm* — Cooper Legal Group, LLC

(57) ABSTRACT

A wireless high-temperature probe with time-multiplexed NTC leads and a manufacturing method thereof include a probe tube assembly, a ceramic insulating ring and a coaxial coupling shaft which are successively connected. The probe tube assembly is internally provided with a PCBA, the PCBA is integrated with leads of an ambient temperature sensor, a time-sharing multiplexing circuit configured to be selectively connected with a radio frequency transceiver circuit or an RC charge-discharge temperature measurement circuit, and at least two temperature sensors. The ceramic insulating ring is arranged at a joint between the probe tube assembly and the coaxial coupling shaft to form a closed inner cavity. The coaxial coupling shaft includes an outer metal wall configured to be a radio frequency signal ground and an inner metal conductor configured to form a coaxial transmission structure together with the leads of the ambient temperature sensor.

10 Claims, 4 Drawing Sheets

Food NTC

Ambient NTC

View 1

View 2

Food
NTC

Ambient
NTC

A

WIRELESS HIGH-TEMPERATURE PROBE WITH TIME-MULTIPLEXED NTC LEADS AND MANUFACTURING METHOD THEREOF

CROSS-REFERENCE RELATED APLICATION

This application is a continuation of PCT application serial no. PCT/CN2025/127187, filed on Oct. 13, 2025, which claims the priority and benefit of Chinese patent application serial no. 202511082228.4, filed on Aug. 4, 2025. The entireties of PCT application serial no. PCT/CN2025/127187 and Chinese patent application serial no. 202511082228.4 are hereby incorporated by reference herein and made a part of this specification.

TECHNICAL FIELD

The present application relates to the technical field of wireless temperature probe, and particularly, to a wireless high-temperature probe with time-multiplexed NTC leads and a manufacturing method thereof.

BACKGROUND ART

At present, wireless temperature probes are applied in scenarios such as food temperature measurement. In the existing technique, wireless temperature probes often adopt a design where a single NTC lead is reused as an antenna (e.g., U.S. Pat. No. 12,196,619B2), but this solution has significant drawbacks. When radio frequency signals are coupled to the temperature sensor through the lead, high-frequency noise will disturb the accuracy of temperature measurement, resulting in a temperature measurement error of up to ±1.5°. This problem arises because the physical connection of the lead between the radio frequency mode and the temperature measurement mode has not been effectively isolated, and there is a lack of shielding design against electromagnetic interference. Although existing solutions attempt to reduce costs through hardware reuse, the core contradiction lies in the mutual interference between the radio frequency function and the temperature sensing function, which becomes a technical bottleneck restricting high-precision temperature measurement performance.

SUMMARY

To overcome the deficiencies of the existing technique, to effectively eliminate the mutual interference between the radio frequency function and the temperature sensing function of the wireless temperature probe, and to provide a high-temperature wireless temperature probe with high-precision temperature measurement performance, the present application provides a wireless high-temperature probe with time-multiplexed NTC leads and a manufacturing method thereof.

In a first aspect, the objective of the present application is achieved by using the following technical solution:

A wireless high-temperature probe with time-multiplexed NTC leads includes a probe tube assembly, a ceramic insulating ring and a coaxial coupling shaft which are successively connected.

The probe tube assembly is internally provided with a PCBA, the PCBA is integrated with leads of an ambient temperature sensor, a time-sharing multiplexing circuit configured to be selectively connected with a radio frequency transceiver circuit or an RC charge-discharge temperature measurement circuit, and at least two temperature sensors.

The ceramic insulating ring is arranged at a joint between the probe tube assembly and the coaxial coupling shaft to form a closed inner cavity.

The coaxial coupling shaft includes an outer metal wall configured to be a radio frequency signal ground and an inner metal conductor configured to form a coaxial transmission structure together with the leads of the ambient temperature sensor.

By using the above technical solution, radio frequency communication and temperature measurement are achieved without mutual interference based on the time-sharing multiplexing circuit. Through the time-sharing multiplexing of the leads of the ambient temperature sensor as a radio frequency antenna, along with the implementation of the coaxial coupling structure for electromagnetic shielding, interference from radio frequency signals on the temperature measurement is effectively eliminated, so that the temperature measurement accuracy is improved from ±1.5° C. to ±0.3° C. Additionally, by utilizing a ceramic ring's thermal expansion compensation design and the coaxial shielding characteristics of the metal connecting shaft, issues of structural cracking and sealing failure in high-temperature environments are resolved. As a result, the overall volume is reduced, and the production yield rate is increased.

In an optional embodiment of the present application, the time-sharing multiplexing circuit includes:

a first switch module configured to control connection and disconnection between a radio frequency matching circuit and the leads of the ambient temperature sensor, a second switch module configured to control connection and disconnection between the RC charge-discharge temperature measurement circuit and the leads of the ambient temperature sensor, and a control unit configured to coordinate sequential operations of the first switch module and the second switch module.

The first switch module and the second switch module are switched to a radio frequency mode or a temperature measurement mode via a shared I/O port of the control unit.

By using the above technical solution, the radio frequency and temperature measurement circuits are time-multiplexed, eliminating the interference from high-frequency noise on the temperature sensor, and thus improving the accuracy and reliability of data transmission.

In an optional embodiment of the present application, a multiplexing method of the leads of the ambient temperature sensor includes a single-lead mode, and in the single-lead mode, the first switch module comprises a radio frequency switch and a capacitor, one end of the radio frequency switch is coupled to one of the leads of the ambient temperature sensor through the capacitor, and the other end of the radio frequency switch is coupled to the control unit through the radio frequency matching circuit, the second switch module comprises an analog switch and a capacitor, one end of the analog switch is inductively coupled to another lead of the leads of the ambient temperature sensor while the other end of the analog switch is connected to the RC charge-discharge temperature measurement circuit:

when the shared I/O port is at a first logic level, the radio frequency switch is closed and the analog switch is open, the leads of the ambient temperature sensor are connected to a radio frequency signal path, and when the shared I/O port is at a second logic level, the radio frequency switch is open and the analog switch is closed, and the leads of the ambient temperature sensor are connected to a temperature measurement path.

By using the above technical solution, when the analog switch disconnects the radio frequency path, the RC circuit accurately measures the resistance value of the temperature sensor, thereby improving the measurement accuracy of the temperature sensor. Sharing the shared I/O port saves chip pins and simplifies the hardware.

In an optional embodiment of the present application, a multiplexing method of the leads of the ambient temperature sensor includes a dual-lead mode, and in the dual-lead mode, the time-sharing multiplexing circuit includes a balun configured to convert two leads of the leads of the ambient temperature sensor into differential signals;

the first switch module and the second switch module are respectively coupled to two output ends of the balun, and the RC charge-discharge temperature measurement circuit is configured to calculate a temperature value based on a relationship between a fixed charging capacitor and a RC time constant.

By using the above technical solution, the dual-lead mode converts differential signals by using the balun, enhancing anti-interference capability. Furthermore, temperature calculation based on a fixed charging capacitor improves temperature measurement accuracy.

In an optional embodiment of the present application, the probe tube assembly further includes a metal probe tube and a battery welded to a front end of the PCBA, one of the at least two temperature sensors is designed in a form of a lead with a lead end welded on the PCBA and a probe end extending to a tip of the metal probe tube.

The PCBA is provided with metal spring contacts in contact with an inner wall of the metal probe tube, and the metal spring contacts serve as positive charging poles.

A stepped-down end section of the PCBA is inserted into a small-diameter tube section of the coaxial coupling shaft, and a negative spring contact is provided to connect a ground terminal of the PCBA with an inner wall of the small-diameter tube section, so as to form a charging circuit.

By using the above technical solution, combined with the design of the positive charging pole and the negative spring contact, stable power supply to the internal circuit of the probe is ensured, enabling long-term use in harsh environments such as high temperatures.

In an optional embodiment of the present application, the ceramic insulating ring is positioned at the joint between the metal probe tube and the coaxial coupling shaft through an outer annular groove, and an inner cavity of the ceramic insulating ring is closed while an outer surface of the ceramic insulating ring is configured with an adhesive application groove, so as to insulate and isolate the metal probe tube from the inner metal conductor of the coaxial coupling shaft.

By using the above technical solution, the ceramic insulating ring achieves insulation and isolation through the adhesive reservoir, effectively preventing the risk of short circuit between the inner and outer conductors.

In an optional embodiment of the present application, the wireless high-temperature probe with time-multiplexed NTC leads further includes a ceramic handle, a diameter of an inner cavity of the ceramic handle is designed to match a diameter of a probe of the ambient temperature sensor, a pin end of the ambient temperature sensor is closely attached to an inner wall of the ceramic handle, and a bottom of the ceramic handle is configured with a positioning groove to form an interference fit with the pin end of the ambient temperature sensor.

By using the above technical solution, the ceramic handle not only provides a good thermal insulation, but also forms an interference fit with the pin of the ambient temperature sensor through the positioning groove, thereby enhancing the overall structural strength of the device.

In an optional embodiment of the present application, the coaxial coupling shaft includes:

a metal outer wall with a coaxial hole therein, where an annular groove and a barb at an inner end of the coaxial shaft, the annular groove and the barb are designed to form an adhesive reservoir on an outer wall of the ceramic handle to form an adhesive sealing chamber.

By using the above technical solution, the inner end design of the coaxial coupling shaft cooperates with the outer wall of the ceramic handle to form a sealing chamber, which improves the waterproof and dustproof performance of the device.

In an optional embodiment of the present application, the PCBA is internally integrated with a plurality of equidistantly distributed surface-mount temperature sensors and is surround by a thermal pad, an outer surface of the ceramic insulating ring is configured with a depth warning indicator ring, and an extension section of the leads of the ambient temperature sensor serves as an antenna radiator.

By using the above technical solution, the surface-mount temperature sensors on the PCBA are equidistantly distributed, and combined with the application of the thermal pad, which ensures the uniformity and sensitivity of temperature sensing. The design of the antenna radiator further optimizes the transmission efficiency of wireless signals.

In a second aspect, an objective of the present application is achieved by using the following technical solution:

A manufacturing method of a high-temperature wireless temperature probe includes following steps:

A manufacturing method of a wireless high-temperature probe, characterized by comprising following steps:

inserting a PCBA into a metal probe tube, so that a probe end of a lead-type temperature sensor is located at a tip of the metal probe tube and positive spring contacts are in contact with an inner wall of the metal probe tube, and wrapping the PCBA in a thermal pad, press-fitting a ceramic insulating ring with an end of the metal probe tube and a front end of the coaxial coupling shaft successively, and forming an insulated and sealed structure after curing, inserting a stepped-down end section of the PCBA into a small-diameter tube section of the coaxial coupling shaft, to bring a negative spring contact into contact with an inner wall of the coaxial coupling shaft to form electrical conduction, and securing a relative location between the coaxial coupling shaft and the PCBA by welding, and guiding an extension section of leads of an ambient temperature sensor through an inner cavity of the coaxial coupling shaft and in close contact with an inner wall of a ceramic handle, applying adhesive onto an assembly surface of the coaxial coupling shaft and the ceramic handle, and forming a multi-seal structure after curing.

By using the above technical solution, the surface-mount temperature sensors on the PCBA are equidistantly distributed, and combined with the application of the thermal pad, which ensures the uniformity and sensitivity of temperature sensing. The design of the antenna radiator further optimizes the transmission efficiency of wireless signals.

In summary, the present application includes the following beneficial technical effects:

Through the combined design of the probe tube assembly, ceramic insulating ring and coaxial coupling shaft, wireless temperature detection transmission in high-temperature environments is realized. The leads of the ambient temperature sensor and time-sharing multiplexing circuit integrated on the PCBA enable the device to switch between a radio frequency mode and a temperature measurement mode, ensuring measurement accuracy and stability.

DESCRIPTION OF REFERENCE NUMERALS

1. Probe tube assembly; 11. PCBA; 111. Positive spring contact; 112. Negative spring contact; 12. Metal probe tube; 13. Battery; 14. Leads of Ambient temperature sensor; 2. Ceramic insulating ring; 21. Adhesive application groove; 22. Depth warning indicator ring; 3. Coaxial coupling shaft; 31. Small-diameter tube section; 32. Annular groove; 33. Barb; 4. Ceramic handle; 41. Positioning groove; 42. Gripping groove.

DETAILED DESCRIPTION

The present application will be further described in detail below referring to FIGS. 1-6.

EMBODIMENT 1

Figure 1:
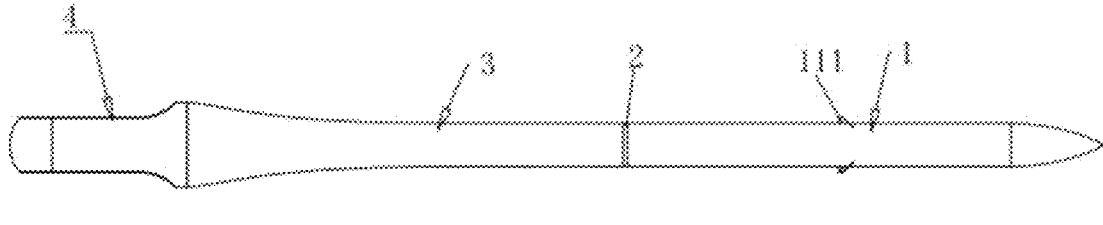
FIG. 1 is an overall structural diagram from two different perspectives of a wireless high-temperature probe with time-multiplexed NTC leads according to an embodiment of the present application.
Figure 1:
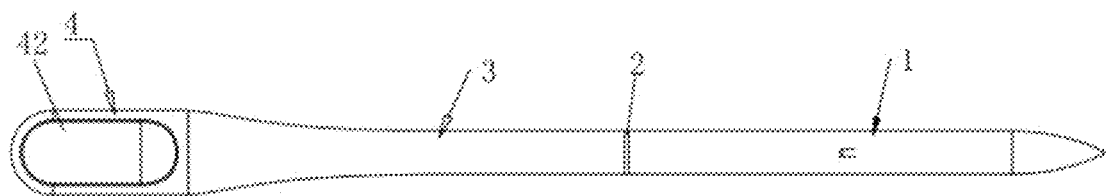
Figure 2:
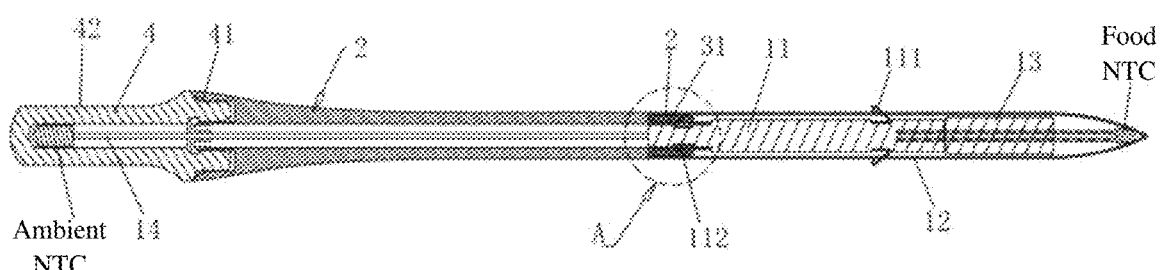
FIG. 2 is an overall cross-sectional view of a wireless high-temperature probe with time-multiplexed NTC leads according to an embodiment of the present application.
Figure 3:
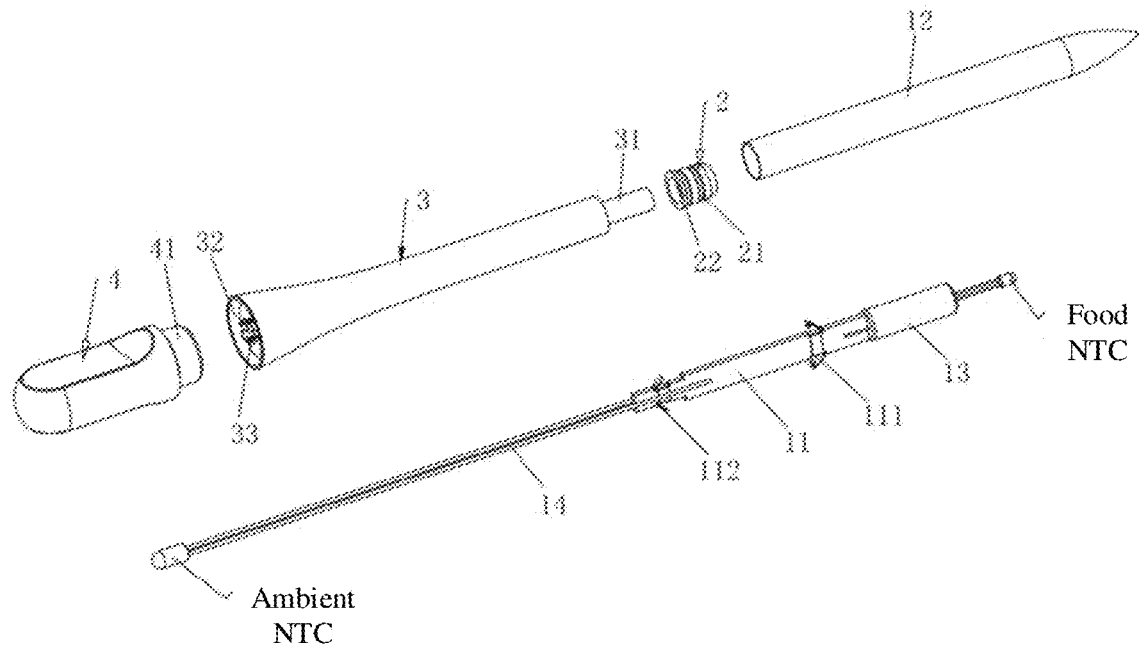
FIG. 3 is an exploded view of a wireless high-temperature probe with time-multiplexed NTC leads according to an embodiment of the present application.

In one embodiment, referring to FIGS. 1 to 3, the present application discloses a wireless high-temperature probe with time-multiplexed NTC leads, the wireless high-temperature probe includes a probe tube assembly 1, a ceramic insulating ring 2, a coaxial coupling shaft 3 and a ceramic handle 4 connected in sequence.

Referring to FIGS. 1 to 3, the probe tube assembly 1 includes a built-in PCBA 11, a metal probe tube 12, and a battery 13 soldered to the frontmost end of the PCBA 11, and the PCBA 11 is integrated with leads of an ambient temperature sensor 14, a time-sharing multiplexing circuit, and at least two temperature sensors. Leads of the ambient temperature sensor 14 extend from the metal probe tube 12 to the ceramic handle 4. In the present application scenario of wireless high-temperature probes for food, the temperature sensor close to the metal probe tube 12 is the food NTC, and the temperature sensor close to the ceramic handle is the ambient NTC. An extension section of the leads of the ambient temperature sensor 14 serves as the antenna radiator. The temperature sensor, as the food NTC, is designed in a form of a lead, with a lead end soldered on the PCBA 11, and the probe end passing over the top end of the battery 13, so that when the PCBA 11 is inserted into the metal probe tube 12, the probe head reaches the tipmost part of the metal probe tube 12, which helps to improve the temperature measurement response speed of the food NTC.

The PCBA 11 is provided with metal spring contacts that make contact with the inner wall of metal probe tube 12, the metal spring contacts serve as the positive charging poles (at this moment, the PCBA 11 is inserted into the metal probe tube 12, also known as positive spring contacts 111, and the positive spring contacts 111 are installed on the left and right sides of the PCBA 11. A stepped-down end section of the PCBA 11 is inserted into the small-diameter tube section 31 of the coaxial coupling shaft 3. The stepped-down end section of the PCBA 11 is provided with a negative spring contact 112, and the negative spring contact 112 is used to connect the ground terminal of the PCBA 11 with the inner wall of the small-diameter tube section 31 to form a charging circuit. The PCBA 11 is internally integrated with a plurality of equidistantly distributed surface-mount temperature sensors (not shown), and is surround by a thermal pad. The thermal pad can be a silicone pad with high thermal conductivity or a phase change pad. Through the thermal pad, heat from the measured object is quickly transferred from the metal probe tube 12 to the surface-mount temperature sensor on the PCBA 11.

Figure 4:
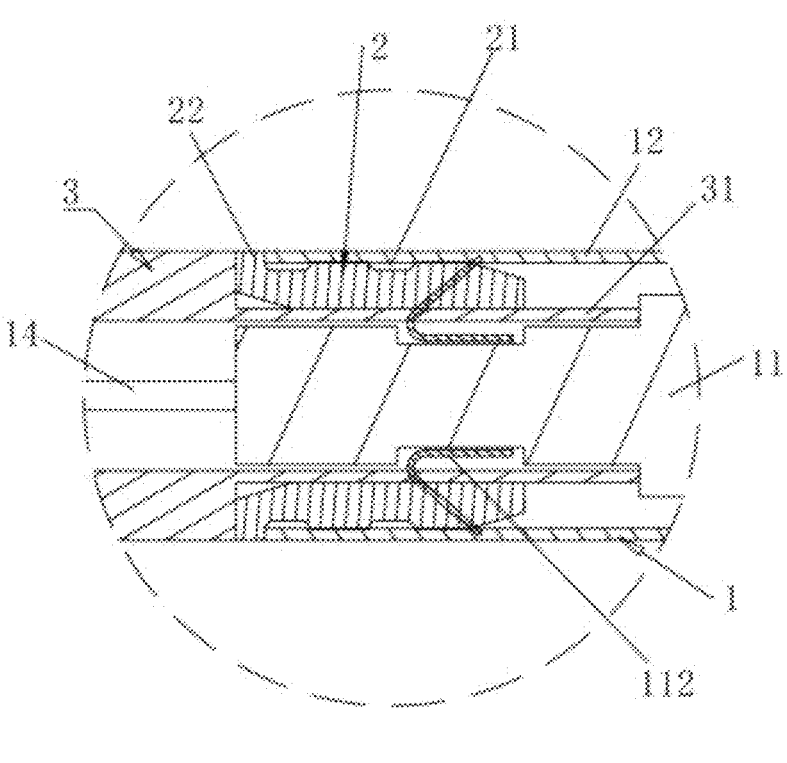
FIG. 4 is a partially enlarged view of A in FIG. 2.
Figure 5:
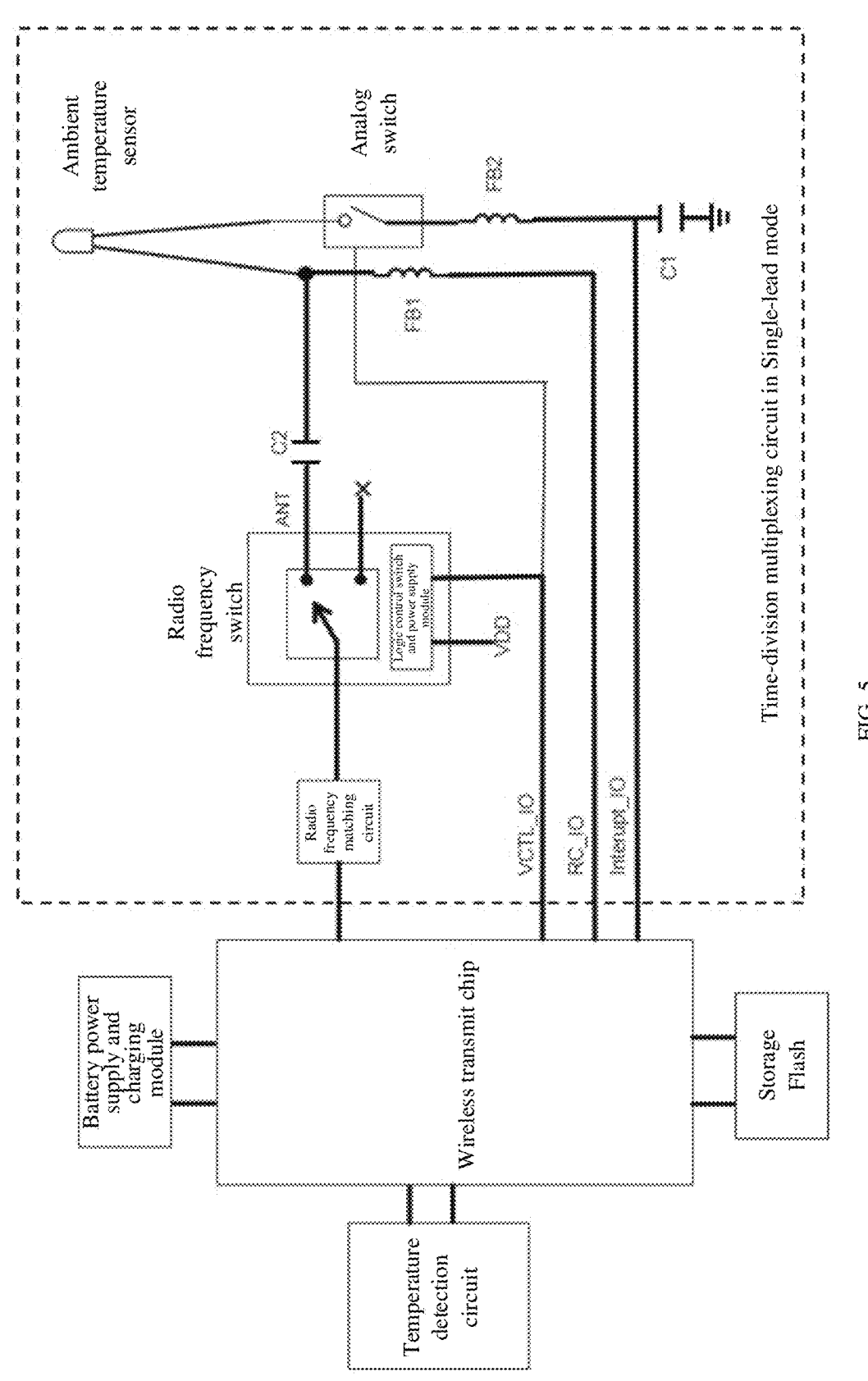
FIG. 5 is a time-sharing multiplexing circuit diagram in a single-lead mode of a wireless high-temperature probe with time-multiplexed NTC leads according to an embodiment of the present application.

Referring to FIGS. 3 to 5, the RC charge-discharge temperature measurement circuit on the PCBA 11 calculates the temperature value based on the relationship between a fixed charging capacitor and the RC time constant. Specifically, the charge-discharge circuit of the present application can utilize a plurality of I/O ports of the control unit to perform RC charge/discharge cycles on different temperature sensors. By means of the time constant $\tau=R\times C$, the charge time is calculated, and a charge capacitance is fixed, thereby allowing the resistance R of the temperature sensor to be determined, from which the corresponding temperature value is obtained, where a high-precision clock enables the temperature measurement accuracy to reach ±0.3° C. Differing from conventional ADC-based temperature measurement circuits, the present design reduces the resource requirement for the chip, does not require a high-precision ADC, only requires a high-precision clock of the system, the chip for which is lower in cost than a high-precision ADC chip.

As shown in FIGS. 2 and 3, the coaxial coupling shaft 3 includes a metal outer wall containing a coaxial hole, a metal inner conductor which forms a coaxial transmission structure with the leads of the ambient temperature sensor 14, and an annular groove 32 and a barb 33 at its end. The coaxial coupling shaft 3 and the leads of the ambient temperature sensor 14 form a coaxial transmission line. The leads of the ambient temperature sensor 14 is wrapped in a high-temperature-resistant insulating layer to avoid contact and short circuits with the metal probe tube 12, thereby suppressing radiation from the metal probe tube 12. The coaxial coupling shaft 3 is a metal connecting shaft, and its metal outer wall serves as a radio frequency signal ground. The annular groove 32 and the barb at the inner end of the coaxial coupling shaft 3 cooperate with and the adhesive reservoir on the outer wall of the ceramic handle 4 to form an adhesive sealing chamber. During connection, the adhesive can be applied to the adhesive sealing chamber to enhance connection fastness and prevent the adhesive from flowing into the inner tube of the coaxial coupling shaft 3. The internal pipe diameter of the coaxial coupling shaft 3 in the present application is very small, so that the part in contact with the PCBA 11 can be simply sealed with adhesive, which effectively seal and isolate the entire PCBA 11 from the coaxial coupling shaft 3 above it, so that even if the upper part is exposed to, it cannot reach the lower PCBA 11, thereby reducing the waterproofing process requirements for the PCBA part.

As shown in FIGS. 3 and 4, the ceramic insulating ring 2 is positioned at the joint of the metal probe tube 12 and the coaxial coupling shaft 3 through an outer annular groove. The inner cavity of the ceramic insulating ring 2 is closed, and the inner cavity forms a closed cavity upon assembly of the ceramic insulating ring 2. In addition, the outer ring is configured with an adhesive application groove 21 to achieve insulation and sealing between the metal probe tube 12 and the inner conductor of the coaxial coupling shaft 3. During connection, adhesive is applied to the adhesive application groove 21 to improve the sealing performance of the joint. The outer surface of the ceramic insulating ring 2 is provided with a depth warning indicator ring 22, such as a distinct black ring. The ceramic insulating ring 2 is used for insulating and sealing the metal probe tube 12 from the coaxial coupling shaft 3 to prevent radio frequency short circuits and short circuits of positive/negative short circuits.

Referring to FIGS. 2 and 3, the diameter of an inner cavity of the ceramic handle 4 is designed to match the diameter of the temperature sensor probe to avoid too much air inside the inner cavity, which helps to improve the sealing effect of the entire wireless high-temperature probe. A pin end of the temperature sensor is closely attached to an inner wall of the ceramic handle 4 to sense the temperature. The bottom of the ceramic handle 4 is configured with a positioning groove 41 to form an interference fit with the pin end of the ambient temperature sensor. The design between the ceramic handle 4 and the coaxial coupling shaft 3 constitutes a press-fit structure. The ceramic handle 4 is designed with a plurality of circular grooves for adhesive storage to increase connection strength. The outer sidewall of the ceramic handle 4 is further configured with a gripping groove 42, allowing for easy handling by pinching the ceramic handle 4 through the gripping groove 42.

Referring to FIG. 5, taking the circuit diagram shown in FIG. 5 as an example, the time-sharing multiplexing circuit selectively connects either the radio frequency transceiver circuit or the RC charge-discharge temperature measurement circuit. The time-sharing multiplexing circuit includes a first switch module, a second switch module and a control unit. The first switch module controls the connection and the disconnection between the radio frequency matching circuit and the leads of the ambient temperature sensor 14. The second switch module controls the connection and disconnection between the temperature measurement circuit and the leads of the ambient temperature sensor 14. The control unit coordinates the sequential operations of the first switch module and the second switch module. The first switch module and the second switch module switch between the radio frequency mode and the temperature measurement mode through the shared I/O port of the control unit.

Specifically, the multiplexing method of the leads of the ambient temperature sensor 14 includes a single-lead mode. In the single-lead mode, the first switch module includes a radio frequency switch and a capacitor C2. One end of the radio frequency switch is capacitively coupled to one wire of the leads of the ambient temperature sensor 14, while the other end is coupled to the control unit through the radio frequency matching circuit. The control unit includes a wireless transmitter chip. An antenna feed point of the wireless transmitter chip is connected to the radio frequency switch through the radio frequency matching circuit. The second switch module includes an analog switch and the capacitor. One end of the analog switch is inductively coupled via an inductor to another wire of the leads of the ambient temperature sensor 14, while the other end is connected to the RC charge-discharge temperature measurement circuit. When the shared I/O port (shown as VCTL_IO) is at the first logic level, the radio frequency switch is closed and the analog switch is open, the leads of the ambient temperature sensor 14 are connected to the radio frequency signal path, and the first logic level is a low level. When the shared I/O port is at the second logic level (high level), the radio frequency switch is open and the analog switch is closed.

In the temperature measurement phase, the leads of the ambient temperature sensor 14 are connected to the temperature measurement circuit path, and at this time, the temperature sensor can perform a temperature measurement. Simultaneously, the RC_IO port is controlled to output 0, which is equivalent to grounding, to discharge the capacitor C2 in the radio frequency circuit, so as to avoid affecting the temperature measurement. After the discharge is completed, timing is initiated while the RC_IO port is pulled high to charge the temperature sensor and a capacitor C1. Since the radio frequency switch is disconnected, the capacitor C2 does not form a closed circuit, so the capacitor C2 is not charged at this time, thus not interfering with the charging process. When the charge on the RC charge-discharge capacitor C1 reaches a certain value that satisfies an interrupt voltage of the Interrupt_IO port, an interrupt is triggered, the timing is stopped, and the recorded duration is used as the charging time to calculate the corresponding temperature. Upon completion of the measurement, the RC_IO port and the Interrupt_IO are simultaneously pulled down to release the charge of the RC charge-discharge capacitor C1. After discharge, the RC_IO port and the Interrupt_IO port are set to open-drain outputs, and then the system enters a radio frequency stage. This time-sharing operation is only applied when the temperature sensor is active, and does not affect the temperature measurements of the other temperature sensor channels.

During the radio frequency stage, the radio frequency switch is closed and the analog switch is open. At this time, the radio frequency circuit of the wireless transmitter chip is connected to the leads of the ambient temperature sensor 14, establishing the radio frequency circuit connection. Data for wireless communication is transmitted through the leads of the ambient temperature sensor 14, which functions as an antenna.

EMBODIMENT 2

Figure 6:
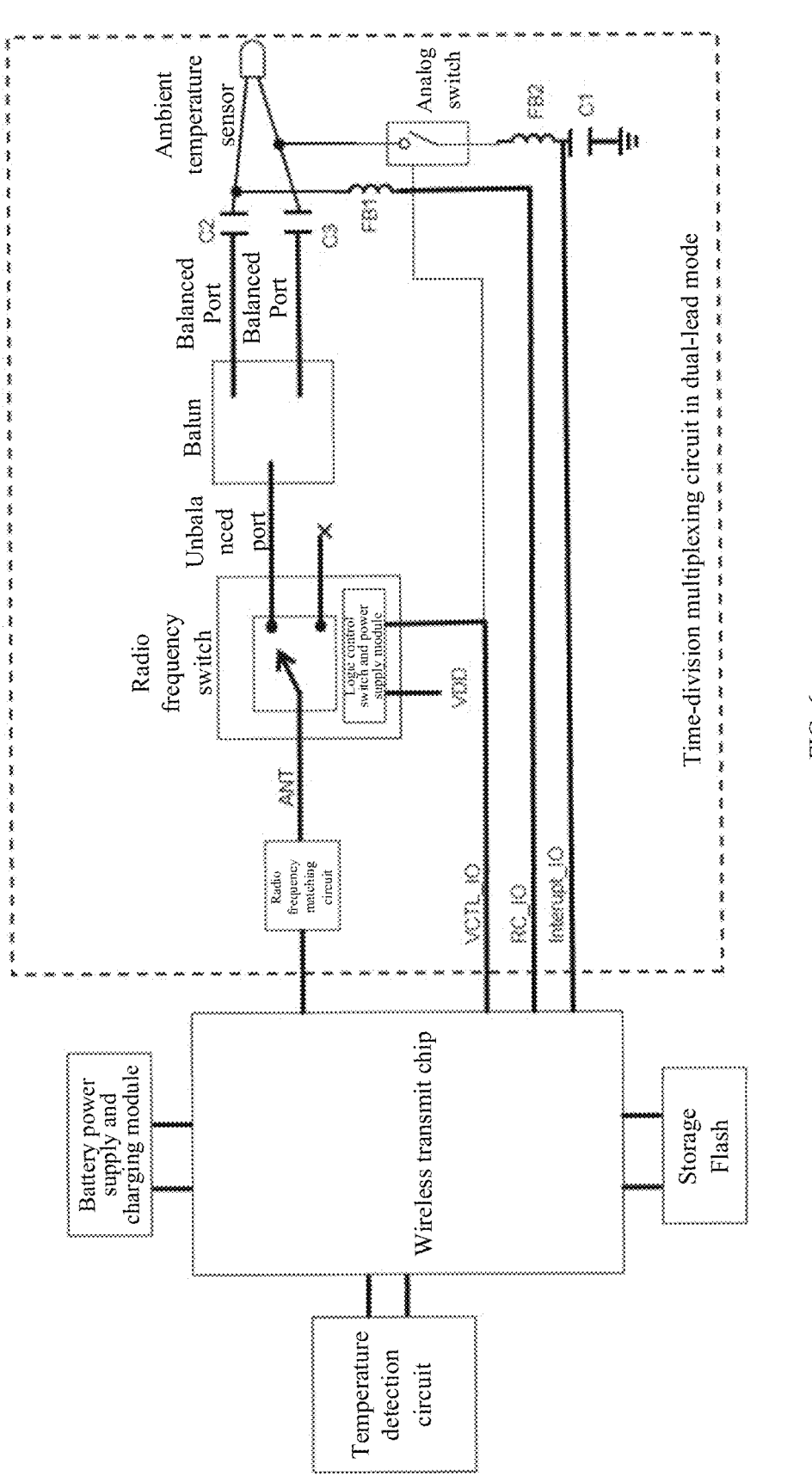
FIG. 6 is a time-sharing multiplexing circuit diagram t in a dual-lead mode of a wireless high-temperature probe with time-multiplexed NTC leads according to an embodiment of the present application.

Referring to FIG. 6, taking the circuit diagram shown in FIG. 6 as an example, the present embodiment differs from Embodiment 1 in that the multiplexing method of the leads of the ambient temperature sensor 14 includes a dual-lead mode. In the dual-lead mode, the time-sharing multiplexing circuit includes a balun to convert two leads of the leads of the ambient temperature sensor 14 into differential signals. That is, the balun is used to convert a single lead into differential leads, thereby repurposing the two antennas of the ambient temperature sensor as differential leads.

The radio frequency switch and the analog switch are respectively coupled to the two output ends of the balun. After blocking the DC component through a capacitor, they are connected to the two leads of the leads of the ambient temperature sensor 14, where one lead is connected to the RC charge-discharge temperature measurement circuit through an inductor, and the other lead of the leads of the ambient temperature sensor 14 is connected to an inductor through the analog switch before being connected to the RC temperature measurement circuit.

During the radio frequency phase, the VCTL_IO port is set to the low level, the radio frequency switch is closed, and the analog switch is open, so that the radio frequency circuit for wireless transmitting is connected to the leads of the ambient temperature sensor 14, thus connecting the radio frequency circuit. In this way, wireless communication data can be transmitted through the antenna.

During the temperature measurement phase, the VCTL_IO port is set to the high level, the radio frequency switch is closed, and the analog switch is open, thus disconnecting the radio frequency circuit for wireless transmission from the leads of the ambient temperature sensor 14. With the radio frequency circuit disconnected, the temperature sensor is connected to the temperature measurement circuit, allowing the ambient NTC to perform temperature measurement. While the software initiates the ambient NTC temperature measurement, it sets the RC_IO port to output 0, which is equivalent to grounding, to discharge the capacitor C2 in the radio frequency circuit, so as to avoid affecting the temperature measurement. Timing is initiated after the discharge is completed, while the RC_IO port is pulled high to charge the temperature sensor and the capacitor C1. Since the radio frequency switch is open, the capacitor C2 does not form a closed circuit, so the capacitor C2 is not charged. When the charge on the RC charge-discharge capacitor C1 reaches a certain value, it meets the interrupt voltage of the Interupt_IO port, an interrupt is triggered. Timing is stopped, the recorded duration is used as the charging time to calculate the corresponding temperature. Upon completion of the measurement, both the RC_IO port and the Interupt_IO port are immediately pulled low to discharge the RC charge-discharge capacitor C1. After the discharge is completed, the RC_IO port and the Interupt_IO are configured as open-drain outputs.

In another embodiment, the present application further discloses a manufacturing method of a wireless high-temperature probe, specifically including the following steps:

S1: inserting the PCBA 11 into the metal probe tube 12, so that a probe tip of a lead-type temperature sensor is located at the tip of the metal probe tube 12, and positive spring contacts 111 are in contact with an inner wall of the metal probe tube 12; and wrapping the PCBA 11 in a thermal pad.

In the present embodiment, the pre-fabricated PCBA 11 is inserted into the interior of the metal probe tube 12, ensuring that the probe tip of the lead-type temperature sensor is pressed against the tipmost location of the metal probe tube 12, and the metal spring contacts (i.e., positive spring contacts 111) on two sides of the PCBA 11 are in close contact with the inner wall of the metal probe tube 12 to form a charging positive circuit. The PCBA 11 is wrapped with a silicone pad or phase change pad with high thermal conductivity as the thermal pad, and the axial location of the PCBA 11 in the metal probe tube 12 is fixed by dispensing adhesive.

S2: tightly press-fitting the ceramic insulating ring 2 with an end of the metal probe tube 12 and a front end of the coaxial coupling shaft 3 successively, and then being cured to form an insulated and sealed structure.

In the present embodiment, high-temperature-resistant sealant is uniformly applied within the annular groove 32 on the outer surface of the ceramic insulating ring 2. One end of the ceramic insulating ring 2 is tightly press-fitted with the end of the metal probe tube 12, while the other end is tightly press-fitted with the front end of the coaxial coupling shaft 3. After assembly, the black depth warning indicator ring 22 of the ceramic insulating ring 2 becomes visible at a joint. Therefore, during use, it can prompt the user to submerge the food over the depth warning indicator ring 22 for temperature measurement, achieving a fool-proof prompt effect.

Specifically, after high-temperature curing, the ceramic insulating ring 2 creates an isolation layer and a hermetically sealed structure, while protecting against the radio frequency short circuits between the metal probe tube 12 and the coaxial coupling shaft 3.

S3: inserting the stepped-down end section of the PCBA 11 into the small-diameter tube section 31 of the coaxial coupling shaft 3, to bring the negative spring contact 112 at the end of the PCBA 11 into contact with the inner wall of the coaxial coupling shaft 3 at the small-diameter tube section to form electrical conduction; and securing a relative location between the coaxial coupling shaft 3 and the PCBA 11 by welding.

In the present embodiment, the multi-seal structure formed by the ceramic insulating ring 2 and the barb 33 of the coaxial coupling shaft 3 can resolve the challenges of maintaining high-temperature hermeticity while ensuring production yield.

Specifically, the stepped-down end section of the PCBA 11 is inserted into the small-diameter tube section 31 of the coaxial coupling shaft 3, to ensure that the negative spring contact 112 at the end of the PCBA 11 is in close contact with the inner wall of the coaxial coupling shaft 3 at the small-diameter tube section, forming a charging negative circuit. A relative location between the coaxial coupling shaft 3 and the PCBA 11 is secured by a laser spot welding process.

S4: guiding an extension section of the leads of the ambient temperature sensor 14 through an inner cavity of the coaxial coupling shaft 3 and in close contact with the inner wall of the ceramic handle 4, applying adhesive onto an assembly surface of the coaxial coupling shaft 3 and the ceramic handle 4, and forming a multi-seal structure after being cured.

In the present embodiment, the extension section of the leads of the ambient temperature sensor 14 is used as the antenna radiator.

Specifically, the extension section of the leads of the ambient temperature sensor is guided through the inner cavity of the coaxial coupling shaft 3, to bring the lead end in close contact with the inner wall of the ceramic handle 4 to realize the temperature sensing function. The sealant is applied onto the assembly surface between the annular groove 32 of the coaxial coupling shaft 3 and the ceramic handle 4. A multi-seal protection structure is formed at the joint between the coaxial coupling shaft 3 and the ceramic handle 4. The barb 33 of the coaxial coupling shaft 3 is configured to prevent adhesive from seeping into the coaxial channel.

It is to be noted that the step numeration in the preceding embodiments carries no implication of execution order. The actual sequence of operations is governed by functional requirements and inherent logic, and must not be interpreted as limiting the implementation of these embodiments.

A person skilled in the art may clearly understand that, for the convenience and brevity of description, the division of the above-mentioned functional units and modules is merely exemplary. In practical applications, the aforementioned functions may be assigned to be completed by different functional units or modules as required. That is, the internal structure of the apparatus may be divided into different functional units or modules to complete all or part of the functions described above.

The embodiments described above are merely intended to illustrate the technical solutions of the present application, but not to limit them. Although the present application has been described in detail with reference to the foregoing embodiments, it should be understood by a person of ordinary skill in the art that they may still modify the technical solutions described in the foregoing embodiments or make equivalent substitutions to some of the technical features. Any such modifications or substitutions shall not deviate the essence of the corresponding technical solutions from the spirit and scope of the technical solutions of the embodiments of the present application, and shall fall within the protection scope of the present application.

What is claimed is:

1. A wireless high-temperature probe with time-multiplexed negative temperature coefficient (NTC) leads, comprising a probe tube assembly, a ceramic insulating ring and a coaxial coupling shaft which are successively connected, wherein the probe tube assembly is internally provided with a printed circuit board assembly (PCBA), the PCBA is integrated with leads of an ambient temperature sensor, a time-sharing multiplexing circuit configured to be selectively connected with a radio frequency transceiver circuit or an RC charge-discharge temperature measurement circuit, and at least two temperature sensors, the ceramic insulating ring is arranged at a joint between the probe tube assembly and the coaxial coupling shaft to form a closed inner cavity, and the coaxial coupling shaft comprises an outer metal wall configured to be a radio frequency signal ground and an inner metal conductor configured to form a coaxial transmission structure together with the leads of the ambient temperature sensor.

2. The wireless high-temperature probe with time-multiplexed NTC leads according to claim 1, wherein the time-sharing multiplexing circuit comprises:

a first switch module configured to control connection and disconnection between a radio frequency matching circuit and the leads of the ambient temperature sensor, a second switch module configured to control connection and disconnection between the RC charge-discharge temperature measurement circuit and the leads of the ambient temperature sensor, and a control unit configured to coordinate sequential operations of the first switch module and the second switch module, wherein the first switch module and the second switch module are switched to a radio frequency mode or a temperature measurement mode via a shared input/output (I/O) port of the control unit.

3. The wireless high-temperature probe with time-multiplexed NTC leads according to claim 2, wherein a multiplexing method of the leads of the ambient temperature sensor comprises a single-lead mode, and in the single-lead mode, the first switch module comprises a radio frequency switch and a capacitor, a first end of the radio frequency switch is coupled to one of the leads of the ambient temperature sensor through the capacitor, and a second end of the radio frequency switch is coupled to the control unit through the radio frequency matching circuit, the second switch module comprises an analog switch and a capacitor, a first end of the analog switch is inductively coupled to another lead of the leads of the ambient temperature sensor while a second end of the analog switch is connected to the RC charge-discharge temperature measurement circuit, and when the shared I/O port is at a first logic level, the radio frequency switch is closed and the analog switch is open, the leads of the ambient temperature sensor are connected to a radio frequency signal path, and when the shared I/O port is at a second logic level, the radio frequency switch is open and the analog switch is closed, and the leads of the ambient temperature sensor are connected to a temperature measurement path.

4. The wireless high-temperature probe with time-multiplexed NTC leads according to claim 2, wherein a multiplexing method of the leads of the ambient temperature sensor comprises a dual-lead mode, and in the dual-lead mode, the time-sharing multiplexing circuit comprises a balun configured to convert two leads of the leads of the ambient temperature sensor into differential signals, the first switch module and the second switch module are respectively coupled to two output ends of the balun, and the RC charge-discharge temperature measurement circuit is configured to calculate a temperature value based on a relationship between a fixed charging capacitor and a RC time constant.

5. The wireless high-temperature probe with time-multiplexed NTC leads according to claim 1, wherein the probe tube assembly further comprises a metal probe tube and a battery welded to a front end of the PCBA, one of the at least two temperature sensors is designed in a form of a lead with a lead end welded on the PCBA and a probe end extending to a tip of the metal probe tube, the PCBA is provided with metal spring contacts in contact with an inner wall of the metal probe tube, and the metal spring contacts serve as positive charging poles, and a stepped-down end section of the PCBA is inserted into a small-diameter tube section of the coaxial coupling shaft, and a negative spring contact is provided to connect a ground terminal of the PCBA with an inner wall of the small-diameter tube section, so as to form a charging circuit.

6. The wireless high-temperature probe with time-multiplexed NTC leads according to claim 5, wherein the ceramic insulating ring is positioned at a joint between the metal probe tube and the coaxial coupling shaft through an outer annular groove, and an inner cavity of the ceramic insulating ring is closed while an outer surface of the ceramic insulating ring is configured with an adhesive application groove, so as to insulate and isolate the metal probe tube from the inner metal conductor of the coaxial coupling shaft.

7. The wireless high-temperature probe with time-multiplexed NTC leads according to claim 1, further comprising a ceramic handle, a diameter of an inner cavity of the ceramic handle is designed to match a diameter of a probe of the ambient temperature sensor, a pin end of the ambient temperature sensor is attached to an inner wall of the ceramic handle, and a bottom of the ceramic handle is configured with a positioning groove to form an interference fit with the pin end of the ambient temperature sensor.

8. The wireless high-temperature probe with time-multiplexed NTC leads according to claim 7, wherein the coaxial coupling shaft comprises:

a metal outer wall with a coaxial hole therein, wherein an annular groove and a barb are at an inner end of the coaxial coupling shaft, and the annular groove and the barb are designed to form an adhesive reservoir on an outer wall of the ceramic handle to form an adhesive sealing chamber.

9. The wireless high-temperature probe with time-multiplexed NTC leads according to claim 7, wherein the PCBA is internally integrated with a plurality of equidistantly distributed surface-mount temperature sensors and is surround by a thermal pad, an outer surface of the ceramic insulating ring is configured with a depth warning indicator ring, and an extension section of the leads of the ambient temperature sensor serves as an antenna radiator.

10. A manufacturing method of a wireless high-temperature probe, comprising following steps:

inserting a printed circuit board assembly (PCBA) into a metal probe tube, so that a probe end of a lead-type temperature sensor is located at a tip of the metal probe tube and positive spring contacts are in contact with an inner wall of the metal probe tube, and wrapping the PCBA in a thermal pad, press-fitting a ceramic insulating ring with an end of the metal probe tube and a front end of a coaxial coupling shaft successively, and forming an insulated and sealed structure after curing, inserting a stepped-down end section of the PCBA into a small-diameter tube section of the coaxial coupling shaft, to bring a negative spring contact into contact with an inner wall of the coaxial coupling shaft to form electrical conduction, and securing a relative location between the coaxial coupling shaft and the PCBA by welding, and guiding an extension section of leads of an ambient temperature sensor through an inner cavity of the coaxial coupling shaft and in close contact with an inner wall of a ceramic handle, applying adhesive onto an assembly surface of the coaxial coupling shaft and the ceramic handle, and forming a multi-seal structure after curing.

\* \* \* \* \*